United States Patent Office.

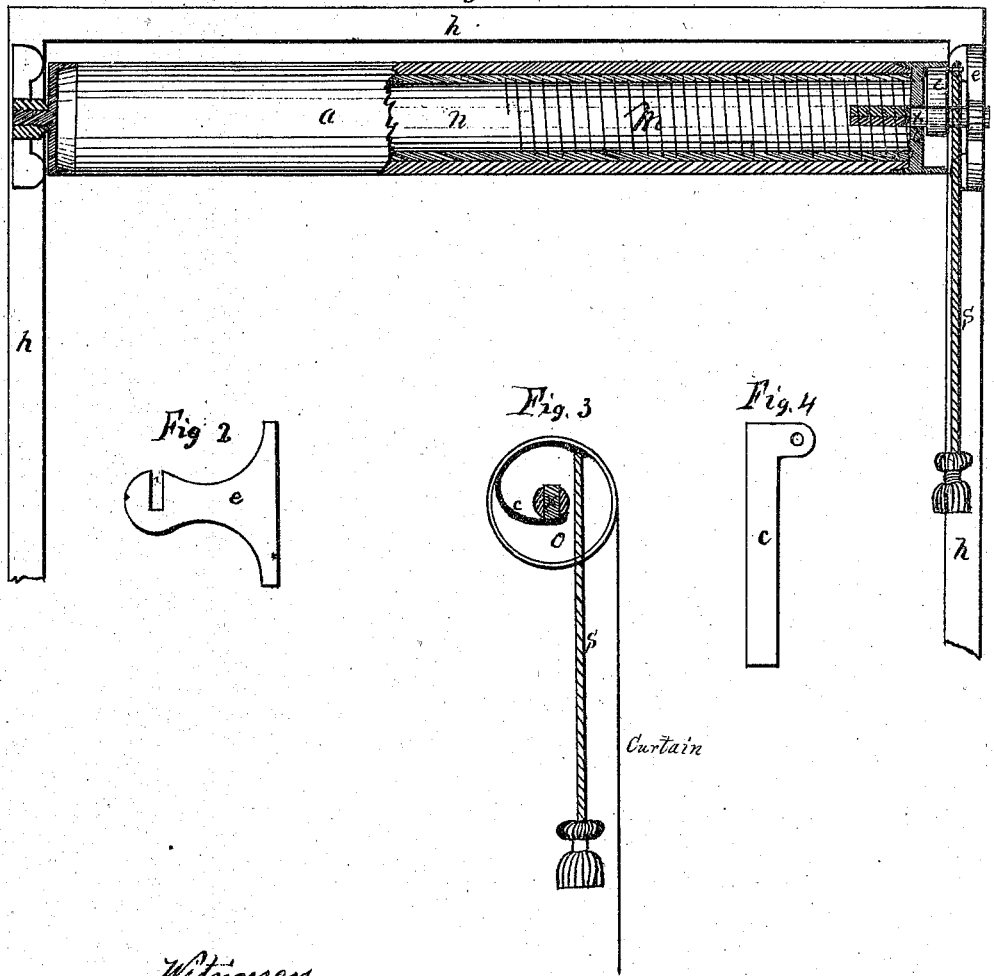

JOHN SHOREY, OF LOWELL, MASSACHUSETTS.

Letters Patent No. 105,854, dated July 26, 1870; antedated July 15, 1870.

IMPROVED SPRING CURTAIN-FIXTURE.

The Schedule referred to in these Letters Patent and making part of the same.

*To all whom it may concern:*

Be it known that I, JOHN SHOREY, of Lowell, in the county of Middlesex and State of Massachusetts, have invented an Improved Spring Curtain-Fixture; and I do hereby declare that the following is a full and exact description thereof, reference being had to the accompanying drawing making part of this specification—

Figure 1 being a view of the fixture complete, attached to a window-frame, a portion of the curtain-roller being in longitudinal section.

Figures 2, 3, and 4, respectively, views of several of the parts to which my improvement relates.

Like letters designate corresponding parts in all of the figures.

The nature of my invention consists in the peculiar arrangement of a spring brake, for holding the curtain in any position required.

The curtain-roller $a$, hollow at one end, and having a tube or hollow spindle, $n$, therein, for the reception of the spiral spring $m$, by the force of which the curtain is wound up, is provided with a cap or thimble, $o$, which has a hollow cylindrical projection outside, for the reception of a spring brake, $c$.

This thimble turns on a bearing, $x$, which is attached to the spindle $n$ inside, and rests in a square, or equivalent form of slot or notch, fig. 2, in the bracket $e$, so that it cannot turn.

The spring brake $c$ is secured at one end to this fixed bearing $x$, and its free end projects upward and along one-half, more or less, of its length, bears against the upper inside surface of the outward hollow projection of the thimble, and, by its pressure thereon, prevents the roller from turning.

The free end of the spring brake has a side projection, provided with a hole or eye, as shown in fig. 4, for the attachment of a cord, $s$. By drawing down on the cord, the spring brake is separated from its contact with the thimble, and the curtain-roller is then free to be raised or lowered.

The advantages of this arrangement of the spring brake inside of the outward hollow projection of the cap or thimble of the curtain-roller are, that the construction is very simple and cheap; the spring brake is concealed from view, except the small projecting portion; that it is protected from injury and dust; that more bearing-surface of the brake is obtained in less space than by any other arrangement; and that it holds the curtain very securely.

What I claim as my invention, and desire to secure by Letters Patent, is—

The combination of the interior spring brake $c$ and the outwardly-projecting hollow roller-thimble or cap $o$, constructed and arranged as and for the purpose herein specified.

JOHN SHOREY.

Witnesses:
ALVIN LAWRENCE,
JOSEPH H. KEITH.